INVENTOR.
J. J. Neuman
BY
C. P. Goepel
his ATTORNEY

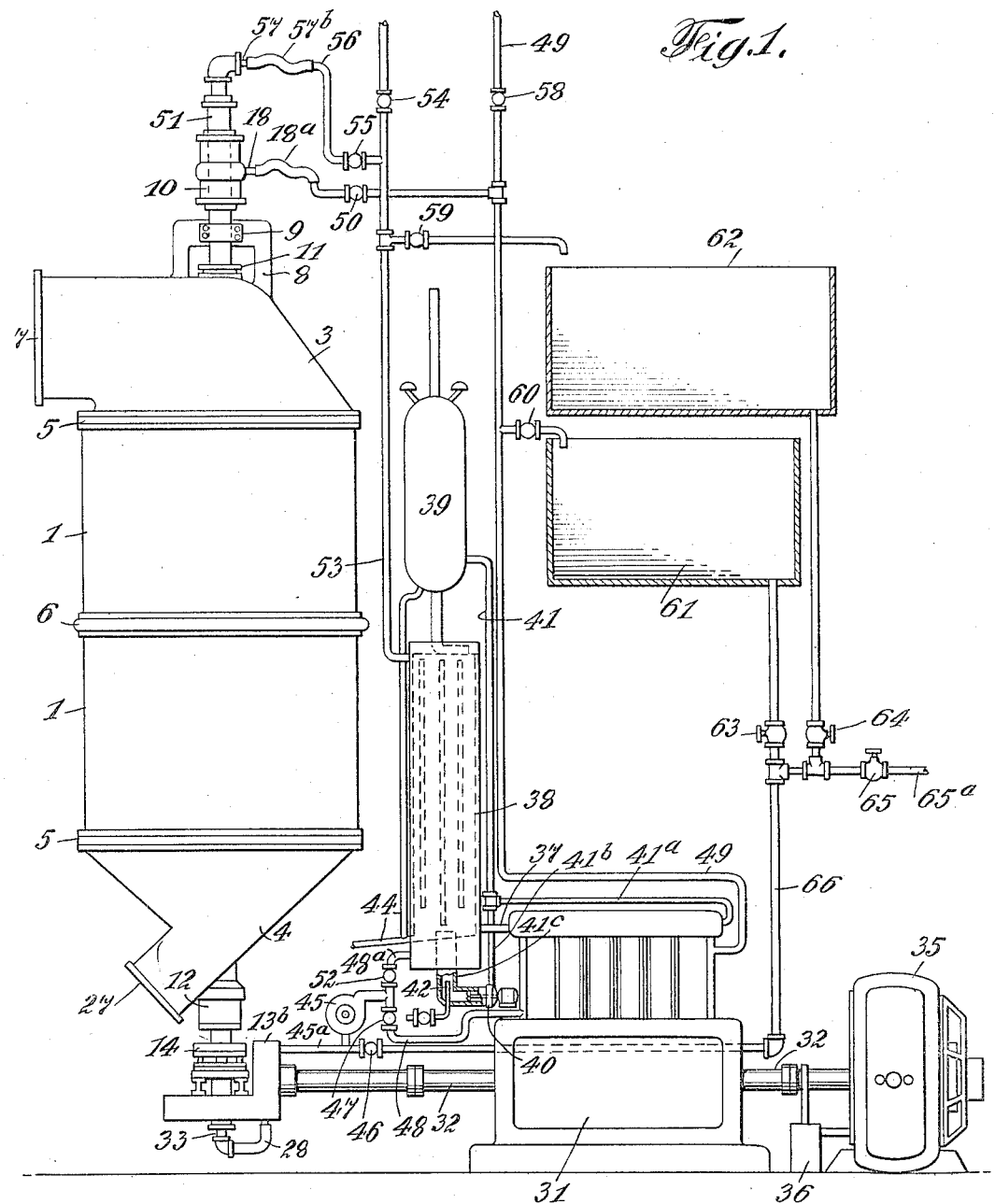

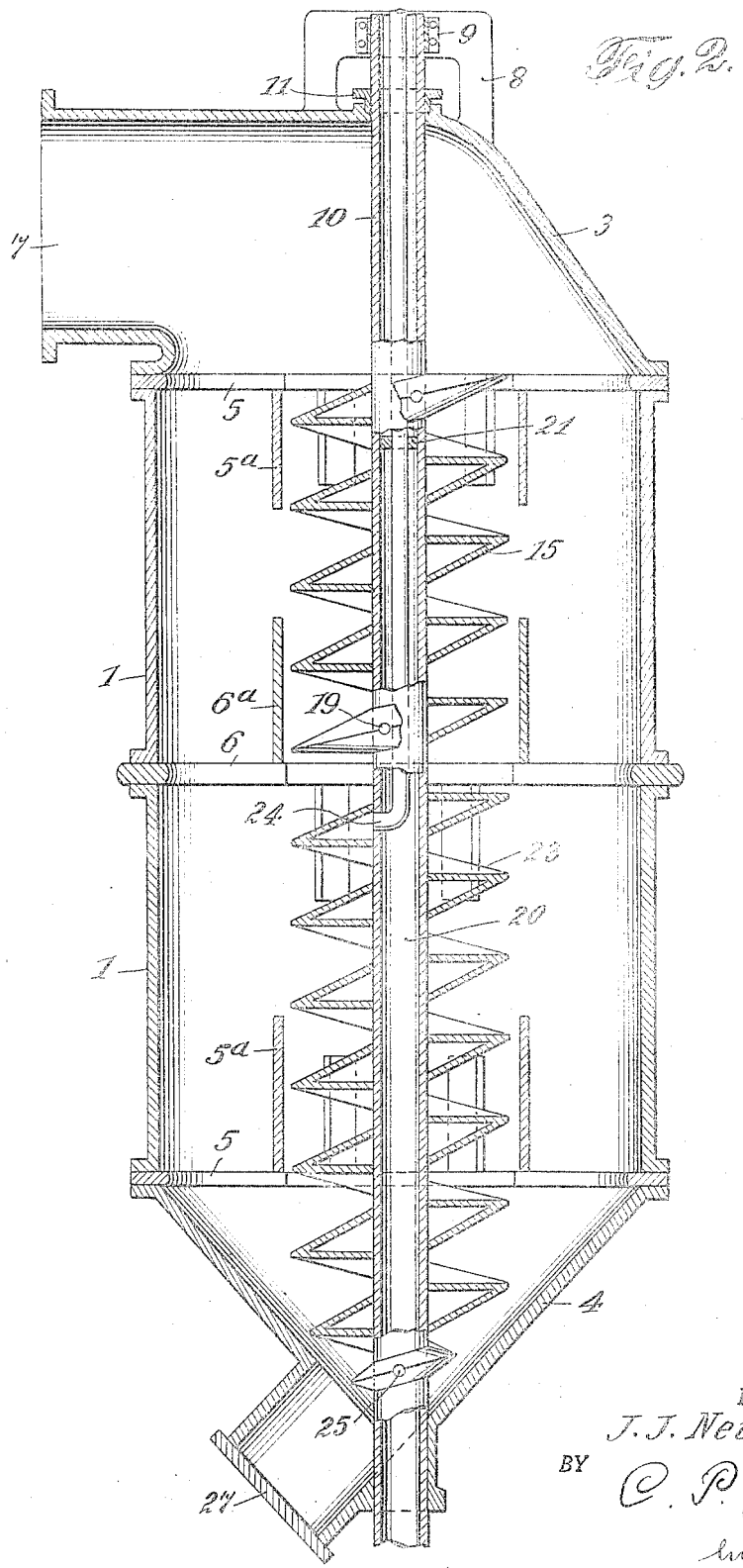

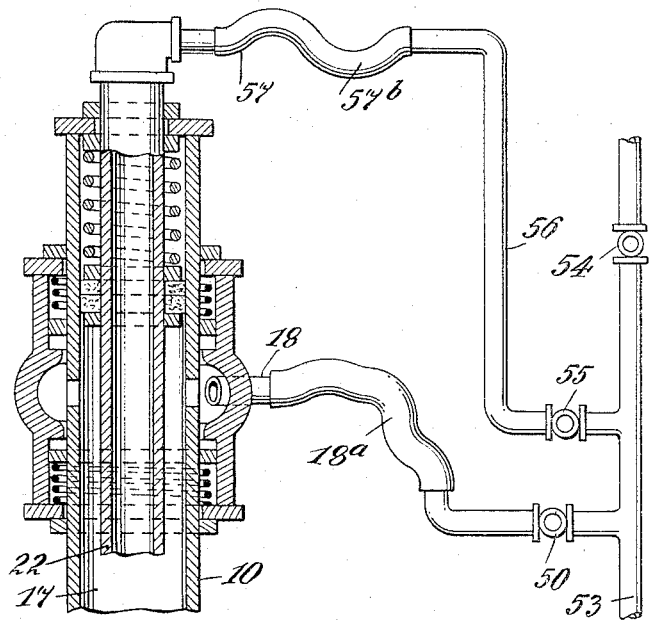
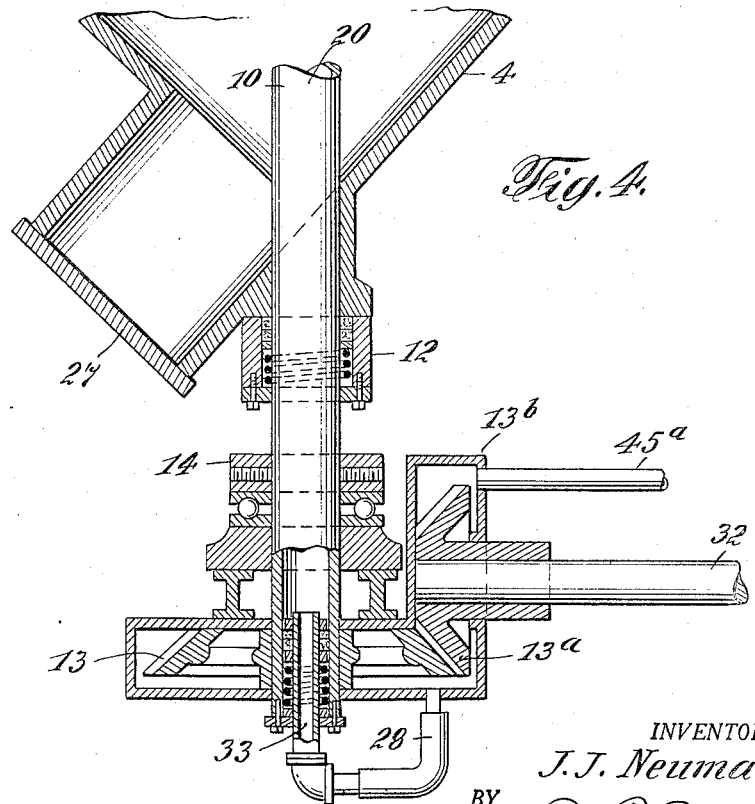

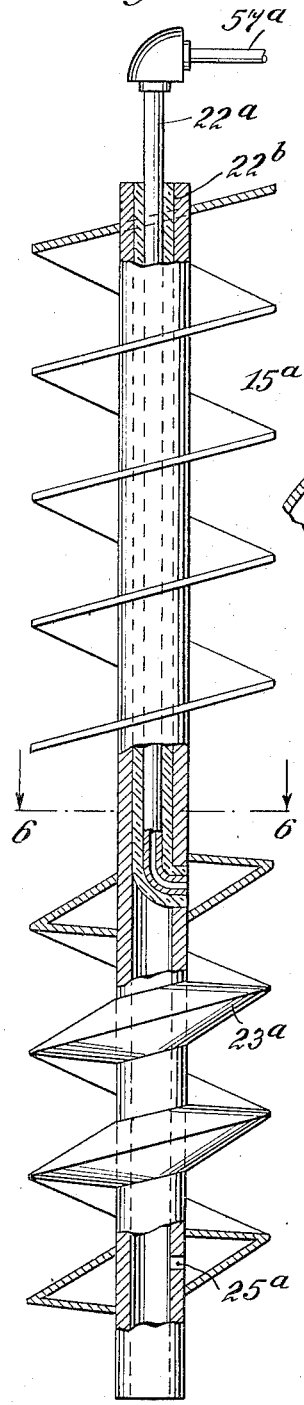
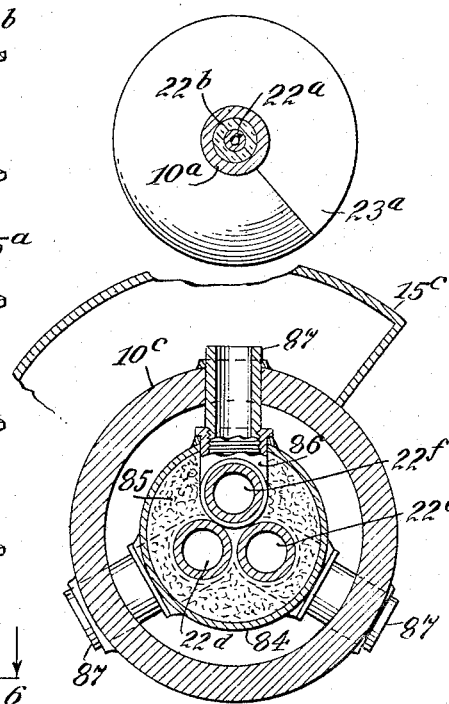
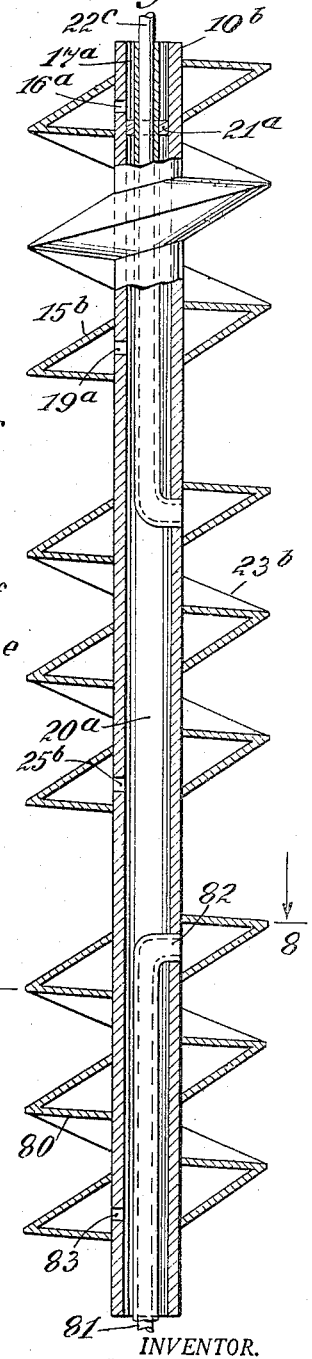
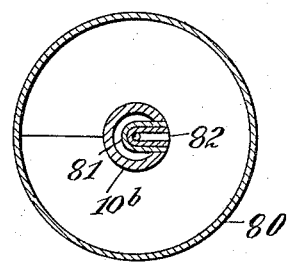

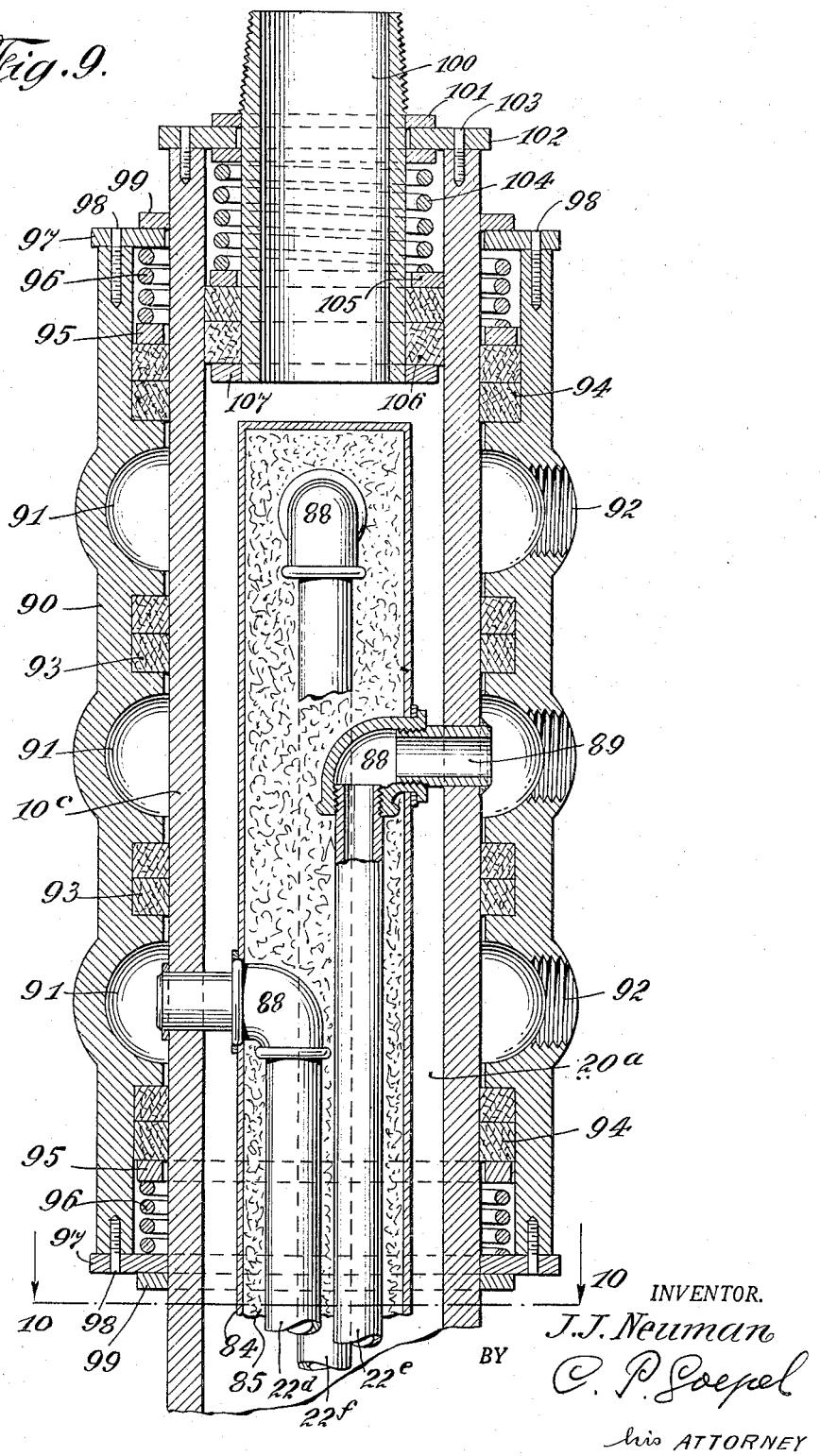

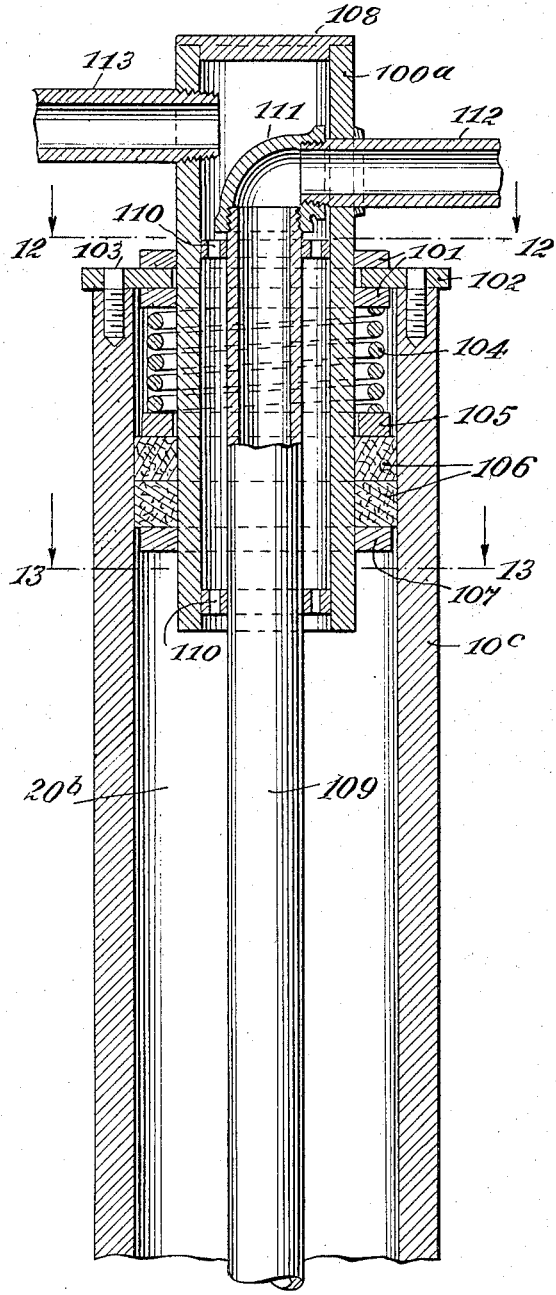

Patented Nov. 23, 1943

2,335,131

UNITED STATES PATENT OFFICE 2,335,131

VACUUM BOILING PAN

Jacob J. Neuman, South Salem, N. Y.

Original application April 11, 1939, Serial No. 267,355. Divided and this application April 11, 1942, Serial No. 438,552

7 Claims. (Cl. 257—78)

This invention relates to new and useful improvements in vacuum boling pans and the like and is directed more particularly to an agitating heater for the material undergoing treatment in the vacuum pan, the present application being a division of my co-pending application, Serial Number 267,355, filed April 11, 1939, which has now matured into Patent No. 2,289,801 on July 14, 1942.

One of the primary objects of the present invention is to increase the rate of boiling or concentration of the material undergoing treatment in a vacuum pan or the like and to this end the invention consists of an agitating heater in the form of a hollow helical conveyor effecting a circulation of the material undergoing treatment and simultaneously presenting a moving heat transfer surface to such material.

Another object of the invention is to provide an agitating heater in which the effective heat transferring surface thereof may be varied and to this end the invention consists of a hollow screw element divided transversely into a number of hollow flight sections providing separate helical conduits for respectively different portions of length of the screw element with each of the helical conduits in communication with a separate source of heat transferring fluid.

A further object of the invention is to provide a sectionalized screw conveyor forming a plurality of helical conduits having separate inlet connections and a common outlet connection for one or more heat transferring fluid or fluids.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of the improved vacuum pan, its installation and connections, all as constructed in accordance with the present invention, parts being broken away and parts being shown in section.

Figure 2 is an enlarged vertical central section taken through the improved vacuum pan, with parts of the flight broken away and shown in section to reveal the piping arrangement of the heating medium.

Figure 3 is a vertical section taken through the pipe head above the vacuum pan and showing the connections thereto partly broken away and partly in section.

Figure 4 is a vertical section of the lower portion of the vacuum pan showing the hollow shaft support and rotating mechanism.

Figure 5 is a side elevation of a modified form of screw or flight and shaft constructed with parts broken away and parts shown in section.

Figure 6 is a cross-section taken on the line 6—6 in Figure 5.

Figure 7 is a side elevation, with parts broken away and parts shown in section, of a still further modified form of flight with a different arrangement of fluid connections thereto.

Figure 8 is a transverse section taken on the line 8—8 in Figure 7.

Figure 9 is a vertical section, with parts broken away, of a modified form of the shaft head with intake fluid connections for the heating medium.

Figure 10 is a horizontal cross-section taken on the line 10—10 in Figure 9.

Figure 11 is a vertical fragmentary section taken through the pipe head showing a further modification of fluid connections for the heating medium supply.

Figure 12 is a horizontal section taken on the line 12—12 in Figure 11.

Figure 13 is a similar view taken on the line 13—13 in Figure 11.

Figure 14:
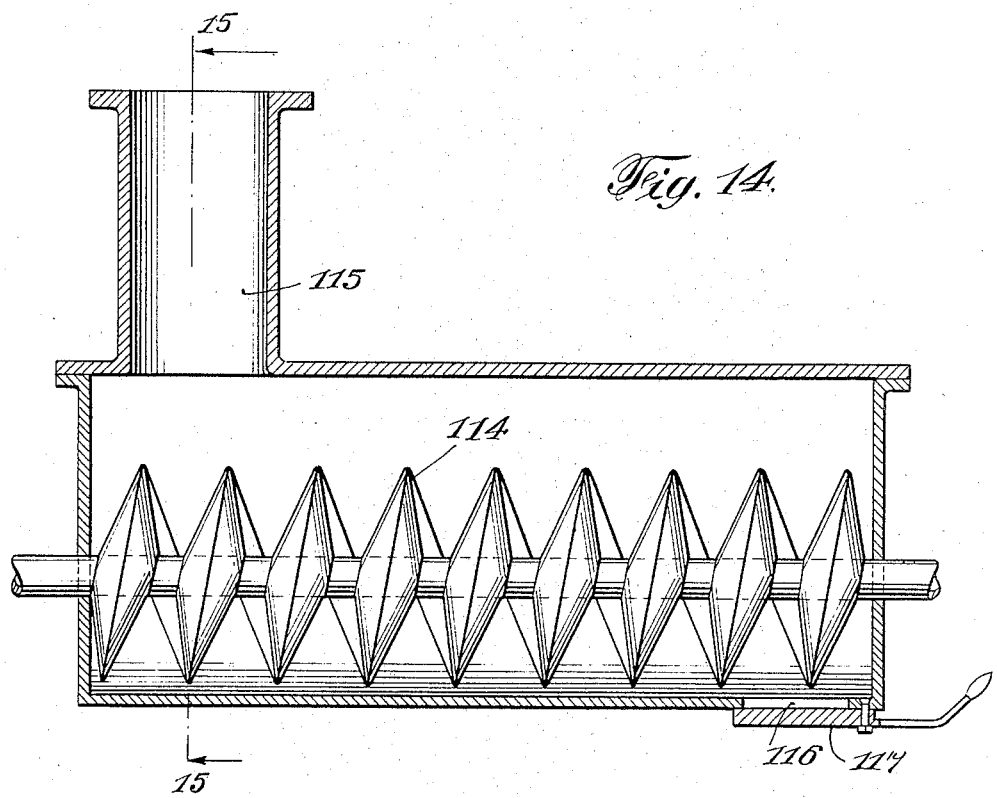
Figure 14 is a horizontal central section taken through a modified form of vacuum pan with horizontal screw.

Referring more particularly to the drawings and for the present to Figures 1 to 4 inclusive, the improved vacuum pan is composed of a casing made up of two or more identical sections 1 secured together in any appropriate manner. Such column or casing is crowned by the cap 3. The lower end of the column is supported upon the base 4, which is preferably of inverted conical form, leading to an outlet through which the treated material may be dumped or evacuated. The sections 1 together with the cap 3 and base 4 form the complete shell of the pan. Separators 5 are shown within the pan near the upper and lower ends of the pan for supporting baffle plates 5ª. A separator 6 and baffle plate 6ª are shown centrally within the pan. Obviously more separators and baffle plates might be used in the case of a pan employing more than two sections 1; or the baffle plates might be omitted for pans of certain types; or the baffle plates might be re-arranged as desired.

Due to the large diameter of shaft used no center bearing within the pan is necessary. The shaft may be made as large as desirable as the added heated surface thereon will justify use of more material and facilitate the attachment of the flights to the shaft.

The upper cap 3 is designed for pipe connection to the vacuum creating condenser pipe line 7. It also has incorporated in it vertical members 8 to support the upper bearing 9 of the shaft 10. The shaft 10 is hollow and constitutes a moving or rotating heater element. A gland packing 11 is provided to assure a tight joint where the shaft 10 passes through the upper portion of the pan cap 3. The new type gland with spring-retained packing, as hereinafter described, may be used at this point if necessary instead of the conventional gland packing.

The base 4 is provided with a gate 27 suitable for emptying and draining out the pan after processing of the substance is finished. Pans used for producing end products in readily-flowable liquid condition, such as evaporated milk or products of similar consistency, would be equipped with pipe connections as well as a gate. The base 4 is also provided with a gland fitting or packing 12 which provides a tight fit for the shaft where entering the pan.

The bevel drive 13, 13$^a$, shown in Figures 2 and 4, is connected to drive the hollow shaft 10 and is attached near the lower end of the shaft. The shaft 10 is provided with a step thrust bearing 14 of suitable type to support the shaft 10 vertically and to hold the bevel gear 13 in positive alignment with the drive pinion 13$^a$ preventing lateral displacement.

As shown more particularly in Figure 2, the heater element of the pan is in the form of a substantially V-shaped hollow helix or screw attached by suitable means to the shaft 10. This helix or screw, while apparently continuous from an external viewpoint, is divided into a number of sections to which the fluid heating medium is separately supplied.

In Figure 2 two such sections are shown. The upper sectionalized flight 15 of the heater element receives its heating medium through an opening 16 in the shaft 10. The hollow shaft 10 itself provides a passage for the fluid downwardly to and through opening 16 and into the upper end of the hollow flight section 15.

As shown in Figure 3, the hollow space or passage 17 within shaft 10 receives the heating fluid from a pipe 18 connected at the upper end of the passage 17.

Reverting to Figure 2, an opening 19 in the shaft near the lower end of the top flight section 15 provides a path for the heating medium to re-enter the hollow shaft 10 after circulating through the section 15. This lower section of the shaft has an internal uninterrupted space 20 with which the opening 19 directly communicates, such passage 20 being for the purpose of carrying off the heating medium and its condensate after passing through the hollow flight sections. The passages 17 and 20 are both within the hollow shaft 10 and they are separated by a plug 21 which is set just below opening 16 thereby preventing the passage of the heating medium received in the upper shaft passage 17 from flowing directly down into the lower passage 20 of the pipe section and being evacuated by that passage 20. The plug 21 also acts as a heat insulated support for the inner pipe 22. This inner pipe is of smaller diameter than the internal diameter of the shaft 10 thus forming with the shaft 10 the annular passage 17. The inner pipe 22 provides a means of introducing fluids to the bottom sectionalized flight 23.

As shown in Figure 3, the inner pipe 22 receives its fluid supply from an inlet connection 57 at the top thereof.

Reverting to Figure 2, the lower end of pipe 22 is turned as indicated at 24 and passed through the pipe 10 to cause communication with the first convolution of the lower hollow helix 23 whereby to cause the fluid or heating medium to circulate downwardly through the bottom helix down toward a discharge opening 25 in the shaft 10 which allows the fluid or its condensate to pass out from the bottom helix 23 into the lower passage 20 of hollow shaft 10, thereby to be evacuated.

It will be noted that the openings 19 and 25, both being discharge openings, each communicate with the passage 20 in the lower part of shaft 10. This passage or common chamber 20 within the hollow shaft constitutes an unimpeded path to the outlet fitting 33 at the lower end of the hollow shaft as shown in Figures 2 and 4.

Referring more particularly to Figure 1, in which the vacuum pan is shown as coupled in an operating system, 31 represents a multiple cylinder internal combustion engine, the drive shaft of which is represented at 32. As shown in Figure 4 this drive shaft drives the bevel gear 13$^a$ which through bevel pinion 13 drives shaft 10 of the rotating heater element.

The engine shaft 32, at the opposite end of the internal combustion engine, drives a generator 35 for providing power at a constant voltage suitable for use on equipment within reasonable distances of power transmission and distribution. The generator is equipped with suitable automatic voltage control 36 which regulates the field current of said generator 35 in suitable relationship with the speed of the internal combustion engine to give constant voltage within the reasonable operating range of speeds of said engine 31.

The exhaust gases from the internal combustion engine 31 are discharged therefrom through outlet or exhaust pipe 37 into the muffler and oxidizing chamber 38. In the muffler the exhaust gases are mixed with an excess of air and a supply of volatile oil vapor, thereby insuring complete combustion of all incompletely burned gases. From the muffler and oxidizing chamber 38 the completely burned gases are led through the air cooler 39, where, by means of counterflow arrangement of tubes carrying fresh and exhaust air, the latter gives up practically all of its heat to the former, providing heated fresh air for the internal combustion engine air intake and the blower by means of the warm air pipe 41, 41$^a$. The blower 40 also receives warm air through the pipes 41 and 41$^b$ and blows this warm air into the muffler 38 through the pipe connection 41$^c$. An oil jet 42 projects into pipe 41$^c$, or in other words into the air line from the blower 40 to the chamber 38. The jet 42 is in communication with a suitable source of oil supply. The air passing jet 42 picks up the oil and volatilizes the same in sufficient quantities to insure that the burning thereof within the muffler 38 shall be continuous.

Both muffler 38 and air cooler 39 are equipped with drainage pipes 44 which permit any condensate formed to be led away to a suitable water pipe or drainage system. The fluid which circulates in the hollow flight sections of the vacuum pan and which is evacuated through the bottom chamber 20 of the hollow shaft 10 is received in the outlet fitting 33, as shown more particularly in Figure 4, and circulated by means of the pipe connection 28 to the casing which houses the bevel gears 13 and 13$^a$. This fluid or circulating medium leaves the bevel gear reduction drive unit 13, 13$^a$ after absorbing heat while passing through its water jacket is pumped into the high pressure line by the pump 45, a pipe 48ª connecting the inlet of pump 45 with the outlet side of the bevel gear casing 13ᵇ. Storage tanks are indicated at 61 and 62, such storage tanks containing make-up fluid or circulating medium. The bottoms of the two reserved tanks 61 and 62 are connected with the inlet of pump 45 by means of a pipe line 66. Valves 63 and 64 control the outlet of fluid respectively from tanks 61 and 62. The pipe 65ª is connected with a source of additional make-up medium supply and a valve 65 controls the inlet of such additional or new make-up material. Pump 45 pumps fluid from the gear casing 13ᵇ together with any needed make-up medium or additional quantity necessary from the reserve storage tanks 61, 62 depending on the adjustment of valve 46 interposed in the pipe line 66. The relative amounts of reserve and new make-up medium introduced are determined by the setting of make-up medium valve 65 and reserve supply valves 63 and 64 for the tanks 61 and 62 respectively.

This fluid or circulating medium may be water, mercury or any other suitable volatile liquid or evaporated gas thereof which could be used to transfer heat from one heat exchange apparatus to another to permit the high thermal efficiencies necessary to the economical operation of the set-up.

On the outlet side of the pump 45 are pipe connections 48 and 48ª having valves 47 and 52 therein. Part of the medium from pump 45, according to the adjustment of valve 47, circulates through the cooling jacket around the cylinders of the internal combustion engine 31, thereby gaining considerable heat while at the same time cooling the engine to a safe operating temperature. After circulating through the cooling jacket of the engine this fluid passes out into pipe 49 and on through valve 50 to pipe 18 which leads into the upper end of shaft 10 by means of fitting 51. The circulation of this fluid or circulating medium through the worm or screw of the vacuum pan has already been described.

The circulating medium from the engine cooling jacket may also be partly led away upwardly through bleeder valve 58 for other uses or through valve 60 into tank 61 for reservation until again needed.

The pump 45 also circulates medium from the cooling casing 13ᵇ of the speed reduction drive unit 13, 13ª, together with the needed make-up medium, according to the adjustment of valve 52 to and through the cooling jacket of the muffler or oxidizing chamber 38 and on out through the pump line 53. A part of this circulating medium may be led out of the system according to the adjustment of the bleeder valve 54, or passed by valve 59 into reserve tank 62. The remaining medium will pass through valve 55 into the pipe line 56. This line is connected to the interior chamber or pipe 22 of the hollow shaft through the end connection 57, as shown to best advantage in Figure 3. The flow of the medium from this point downwardly through the lower flight section has already been described. This medium after being evacuated from the lower flight section is again circulated to the gear reduction casing 13ᵇ.

It is apparent that there may be alternate methods of circulating the medium according to the relative temperature rises and heat available but the principle of using all thermal energy from the exhaust gases and speed reduction gears will hold by any arrangement of piping. Also, the system, to insure complete combustion of exhaust gas from the engine, will not be changed in principle by arranging the air intake ahead of the combustion and oxidizing chamber.

Referring more particularly to Figure 5, a modified design of heater element is shown, in which the upper part of the hollow shaft 10ª has mounted upon it a helical ribbon conveyor flight 15ª with no heater element or features. The lower part has mounted upon it the helical hollow heater element 23ª of V cross-section to be used in heating the substance being processed. Steam is led to this heater element flight 23ª at or near the upper end by means of a concentric pipe 22ª extending down through the hollow shaft 10ª and fitted with an external connection 57ª at or above the upper end of the shaft 10ª for connecting with a source of heating medium supply. The lower end of the heater element flight 23ª has a suitable opening 25ª into the lower open portion of the hollow shaft 10ª, through which the heating fluid flows downward and out at the lower end of the shaft in the manner similar to that of Figure 4. The concentric pipe 22ª is fitted with suitable insulation 22ᵇ on the exterior surface to keep the upper part of the shaft 10ª from becoming too hot. A Bakelite tube 22ᵇ around the pipe is shown but waterproofed asbestos may be used to insure better heat insulation if temperature differential should be of large magnitude.

Referring more particularly to Figures 7 and 8, a worm or moving heater element composed of three sections is illustrated. The top hollow flight section 15ᵇ receives its heating fluid through the outer chamber 17ª of the shaft 10ᵇ. The heating medium flows from chamber 17ª through opening 16ª into the initial helix of worm section 15ᵇ and is evacuated from the final helix or convolution of worm 15ᵇ through opening 19ª, by which the fluid enters the lower passage 20ª of the hollow shaft. A plug 21ª is fitted in the hollow shaft just below opening 16ª to separate chamber 17ª from passage 20ª and to require fluid to enter worm section 15ᵇ through opening 16ª.

The center section 23ᵇ of the hollow flight or worm receives its fluid through pipe 22ᶜ which has a bearing in plug 21ª and communicates with the initial convolution of helix section 23ᵇ. A discharge opening 25ᵇ is made in the shaft 10ᵇ placing the interior passage 20ª in the lower part of the hollow shaft in communication with the final convolution of worm section 23ᵇ. Both of the heater sections 15ᵇ and 23ᵇ receive fluid introduced at the upper end of the shaft 10ᵇ as heretofore described. The bottom section 80 of the hollow flight receives its heating fluid from the bottom through pipe 81 having an angular delivery end 82 extending through the wall of the hollow shaft 10ᵇ and communicating with the initial helix of the hollow worm section 80. A discharge opening 83 is made through the wall of the hollow shaft 10ᵇ within the lower final or end convolution of the hollow flight section 80 for delivering the heating medium from the flight section 80 into the lower passage 20ª of the hollow shaft 10ᵇ. All three discharge openings 19ª, 25ᵇ and 83 open into the lower chamber 20ª of the hollow shaft 10ᵇ. This lower passage 20ª may communicate with the gear casing 13ᵇ as heretofore described. The separating plug 21ª prevents the spent fluids from flowing upward into the chamber 17ª. The pipes or tubes 22ᶜ and 81 are preferably insulated on their exteriors to prevent excessive heat losses.

Figures 9 and 10 show in detail the method of assembling parts at the head of, and within the moving heater element shaft when the flights are sectionalized.

Figure 10 shows a hollow shaft 10c having mounted on it a flight 15c. Within the shaft 10c are grouped the pipe lines 22d, 22e and 22f to feed heating medium to three separate hollow flight sections. These pipes are enclosed in a metal tube 84, all intervening space being packed with asbestos or some other packing material 85, such as cork fragments or other suitable heat insulation. The pipes within tube 84 are preferably separated from one another by appreciable spaces. At the lower ends of the pipes are connected elbows 86 to make a suitable lateral path for connecting to the outer side of the hollow shaft 10c. The lateral or horizontal side or branch of each elbow 86 is welded to the tube 84 before assembling the latter within the hollow shaft 10c. After the assembling within the shaft 10c, short nipples 87 are threaded into the elbows 86 and then welded tight to the outer face of the hollow shaft 10c. This method of connection provides fluid-flow paths either for connection to the heater element flights 15c or to peripheral or annular chambers as hereinafter described in connection with Figure 9. It will be understood that the elbows 86 and the nipples 87 will be brought out from the respective pipes at different elevations to accord with the initial convolutions of the three separate sections of the hollow worm or heater element. For instance one of the nipples 87 will communicate with an opening such as 16a in Figure 7; another nipple 87 of another pipe will communicate with the initial convolution of the intermediate hollow flight section in the manner shown in Figure 7 by the connection of pipe 22c with flight section 23b; and the nipple 87 of the third pipe of Figure 10 will communicate as at 82 in Figure 7 with the flight section 80.

Referring more particularly to Figure 9, this figure shows a modification of the upper part of Figure 3 in which the supply pipes 22d, 22e and 22f are brought up above the vacuum pan into the supply head of the device and communicate with various separated annular supply chambers. The tube 84 and its packing 85 is also extended up within the supply head of the device. The elbows 88 fitted on the various pipes provide means for making connections to nipples 89 extending through to the exterior of the hollow shaft 10c. The method of performing the assembly of these parts is the same as heretofore described for the parts 86 and 87 in Figure 10; it being necessary to make up the interior unit first, welding the elbows 88 to the metal tubing 84; and after insertion of this unit in the hollow shaft 10c the nipples 89 are fitted in place and welded around the outer surface of the hollow shaft 10c. The elbows 88 and nipples 89 of the several pipe sections are brought out on the exterior surface of hollow shaft 10c at different elevations as clearly shown in Figure 9.

This Figure 9 also shows a section through the multiple-type peripheral chamber packing gland fitting with provisions for exterior pipe connections. The shell or casing 90 may be split or formed in two half sections if desired. In such cases this will be necessary to facilitate replacement of the packing when the latter is worn.

The multiple-type peripheral chamber packing gland fitting or shell 90 provides several annular chambers 91. In this case three chambers are shown to accord with the three supply pipes 22d, 22e and 22f, each supply pipe communicating separately with one of the annular chambers 91. These chambers 91 extend horizontally around the hollow shaft 10c. During rotation of shaft 10c the respective nipples 89 continuously communicate with the complemental chambers 91 whereby to receive continuous sources of supply from the external connections. Threaded or other inlet openings 92 receive pipes or pipe nipples, similar to the pipe nipple 18 illustrated in Figure 3. These pipe nipples are connected with the fluid circulatory system.

The intermediate packing rings 93 between the annular chambers 91 have no provision for tightening the packing as slight leakage to an adjacent chamber will do no harm. In the case of sectionalized flights of the moving heater element, mild heating of a flight section out of use can do no harm, it being necessary only to prevent an excessive temperature rise of flight sections which might not be totally immersed in the substance being processed to eliminate the possibility of scorching, discoloring or otherwise physically or chemically changing the said substance.

Packing rings 94 at the upper and lower ends of the fitting or shell 90 are held in place by metallic or other pressure or follower rings 95. Constant compression of the packing is assured by the helical compression springs 96, retained in place by the collars 97. These collars 97 are mounted by suitable cap screws 98 or other means on the ends of the main gland fitting or shell 90. The entire assembly of the peripheral chamber multiple type gland fitting is held in place longitudinally by collars 99. It will be noted however that there is little pressure on these collars 99, the packing ring pressure being held by parts all mounted on the gland fitting 90. The collars 99 are made fast on the hollow rotating shaft 10c.

The external connection facility for the chamber 20a between the metal tube 84 and the wall of hollow shaft 10c is provided by the packing-sealed pipe connection 100, which is threaded to provide for further pipe connections as needed; for instance for connection to the elbow and nipple 57 of Figure 3. Collars 101 mounted on pipe section 100 are divided by end ring 102. This end ring 102 is mounted by cap screws 103 or other suitable means on the end of the hollow shaft 10c. The collars 101 are affixed upon pipe connection 100. In this way the pipe connection 100 is securely held in place at the end of shaft 10c. Compression spring 104 bears on pressure or follower ring 105 which holds pressure constantly on the packing 106.

The use of this arrangement provides three paths for hot heat transfer medium introduction to three sections of flights, and one common outlet for spent heat transfer medium through chamber or passage 20a and pipe connection 100. It will be noted that the outlet flows next the interior surface of the hollow shaft 10c and eliminates local overheating of any part of the exterior surface of the shaft anywhere within the vacuum pan boiling chamber whether immersed or not in the substance being processed; thus guarding against any overheating on the shaft surface. The packing 106 is compressed against an end thrust ring 107 welded or otherwise secured upon the lower end portion of the pipe connection 100. The compression of the packing rings 106 by spring 104 expands packing 106 outwardly against the interior surface of hollow shaft 10ᶜ and avoids leakage of the spent material upwardly over the upper end of hollow shaft 10ᶜ.

Referring more particularly to Figures 11, 12 and 13 the parts are very similar to the upper portion of Figure 9, the pipe connection 100ᵃ being slightly modified in that it is closed at its upper end as by an end cap 108. The packing 106 and its associated parts however is similar to that shown in Figure 9. Extending centrally through hollow shaft 10ᶜ is a long concentric pipe 109 held in place by the tight but perforated collars 110. An elbow 111 is threaded or otherwise secured upon the upper end of pipe 109 and connects with lateral nipple 112 providing a connection for the interior pipe 109. The nipple 112 is welded tight at the joint where it fits through pipe connection 100ᵃ to prevent leakage. A lateral nipple 113 is fitted into pipe connection 100ᵃ to provide access for fluid flow from the space 20ᵇ within the hollow shaft 10ᶜ to the exterior. By arranging the inlet and outlet parts to and from the heater element flight opposite to the chamber 20ᵇ and to the lower end of pipe 109, the flow of heat transfer medium will occur through the flight in through pipe 113 and out through pipe 112; the openings to the heater element being so sloped that when the moving heater element shaft 10ᶜ is rotating flow of the medium in this direction will be encouraged.

Figure 15:
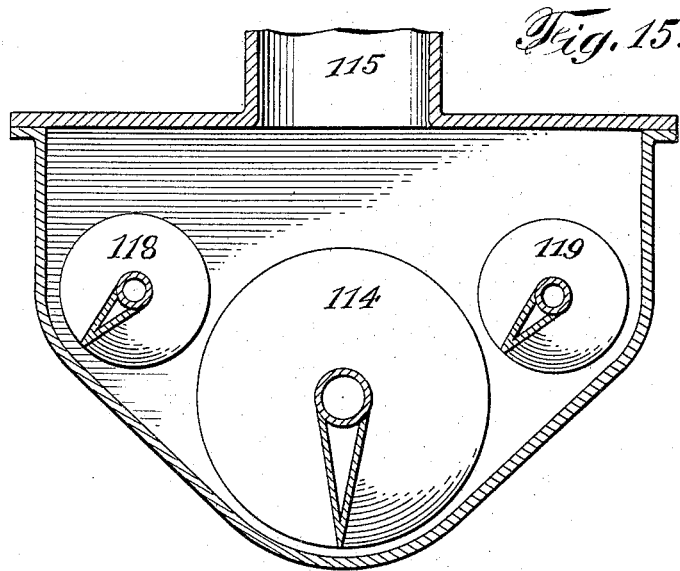
Figure 15 is a vertical section taken on the line 15—15 of Figure 14.

Referring more particularly to Figures 14 and 15, these figures show one arrangement employable in the case of a horizontal worm or heater element installation. The various sections of the heater element and the multiple pipe and gland connections might be as in the types already shown and described. With this type of pan a more convenient coupling of the moving element to the power drive shaft could be arranged. Also there would be less need for sectionalizing the heater elements. The substance being processed would be kept to a depth sufficient to cover the heat transfer surface of the worm or heater element 114 at all times; but if depth should be greater, the positive turbulence of the mass together with the ebullition of the steam would keep the upper part practically as hot as the part of the substance adjacent to the moving heater element. The inlet for the material is indicated at 115 and the outlet at 116 having the movable gate 117. The worm 114 will preferably be rotated to move the substance toward the outlet 116. Should it be necessary to provide for heating the additional depth of substance, additional heater elements or worms 118 and 119 might be provided as shown more particularly in Figure 15 with separate controls for heating the different moving heating elements.

In operation the substance to be processed is brought in at the top of the vacuum pan 1 and after being treated is discharged through the base 4 of the pan either in a continuous operation or at intermittent periods. This substance is subjected in the pan to the heat treatment of the continuously rotated worm or screw, this worm itself progressing spirally through the fluid substance being treated and thus causing all external areas upon the flights to come in contact with large volumes of the substance being treated; and at the same time causing movement in the substance being treated so as to bring all parts of that fluid or liquid substance into physical contact with the external heating surfaces of the worm or flights.

The worm is driven by the internal combustion engine 31 which also drives generator 35 and which provides the means for storing up heat in the heating medium which is used in the vacuum pan.

The water jacket of the internal combustion engine furnishes hot water or steam through pipe 49 to connection 18 and to the chamber 17 of the hollow shaft 10.

After this hot water, steam or other heating medium circulates through the upper hollow flight section 15 it is returned through the passage 20 in the hollow shaft 10 down to the gear casing 13ᵇ. In the gear casing the heat spent in the hollow flight section begins to build up again. This reheated medium from casing 13ᵇ is circulated by pump 45 through pipe connection 48 back to the water jacket of the engine, although part of it may be diverted through pipe 48ᵃ to the water jacket of the muffler 38. The hot water, steam or other heated medium from the jacket of the muffler 38 is circulated by pipe 53 to the connection 57 and thence by pipe 22 to and through the bottom hollow flight section 23 of the vacuum pan, eventually escaping therefrom into passage 20 of the hollow shaft 10 and thence to the gear casing 13ᵇ, in which the spent heating medium undergoes an initial reheating, the same being finally heated either in the engine water jacket or in the muffler jacket.

The heating medium not needed is stored in the reservoirs or tanks 61 and 62 from which it is withdrawn as occasion arises through pipe 66 and circulated back into the system by the pump 45.

Fresh air is heated in the cooler 39 by the products of combustion passing through the same from the muffler 38, and this heated fresh air is delivered by pipes 41 and 41ᵃ to the intake of the internal combustion engine and also by pipes 41 and 41ᵇ to the inlet air pipe 41ᶜ of the muffler into which oil vapor is introduced by the jet or nozzle 42 for the purpose of effectually burning all the products of combustion.

By means of the valves 50 and 55 the heating medium may be turned only into the bottom coil 23 initially if that is desired, and later as the mass in the vacuum pan envelopes the upper flight section 15, the valve 55 may be opened to allow that upper section 15 to become heated. Also the flight sections may be heated at different temperatures. Thus in the beginning of the operation, the upper half of the vacuum pan is ordinarily empty so that the top flight would be left unheated to exclude the possibility of small masses of liquor and the solids therefrom sticking to the otherwise hot surface and becoming scorched, discolored or decomposed. In the case of evaporating milk or liquors of low density, the use of all heater flights would be desirable from the outset. As the evaporation progressed and the substance in the pan retired downwardly below the upper flight sections the heat might be turned off from those sections to avoid accidental decomposition of the substance incident to boiling fluid being splashed against the hot surfaces of upper exposed flight sections. Thus the sectionalized flight arrangement with the individual control for separately heating the sections provides a flexible vacuum pan operating upon a new method of operation and in which heat may be delivered to any part of the pan and any portion of the substance therein for the purpose of individually treating that substance in the manner as best suits the needs of the nature of that substance to the end that processing of the substance may be carried out in a minimum space of time without subjecting the substance to deterioration, decomposition burning, discoloration or any other defects to which existing apparatus and methods subject the material.

In Figures 1 and 3 the pipe nipples 18 and 57 are shown as coupled to flexible pipe sections 18ª and 57ᵇ to allow for variations in fitting connections and to permit alignment of the parts and also to permit free play of the packing.

It is obvious that various changes and modifications may be made in the details of construction and design of the above specifically described embodiment of this invention without departing from the spirit thereof, such changes and modifications being restricted only by the scope of the following claims.

What is claimed is:

1. In a vacuum pan, a longitudinally extending rotating heater element divided transversely in separate hollow spiral sections, a hollow shaft carrying said sections, a supply head on said shaft having an annular chamber in communication with the interior of said hollow shaft and with an initial convolution of one of the spiral sections, a tube extending through said annular chamber and communicating with an initial convolution of another one of said spiral sections, connections to said tube and annular chamber for supplying heating medium thereto, and means for evacuating through said hollow shaft the spent heating medium from said sections.

2. In a vacuum pan, a heater element composed of hollow flight sections, a hollow shaft carrying said sections, a plurality of pipes grouped centrally in said hollow shaft and connected separately with initial convolutions of the flight sections, a packed casing for carrying said pipes in a group spaced from the internal wall of said hollow shaft, said casing and shaft forming between the same an outlet passage, a plurality of annular chambers in separate communication with the upper ends of said pipes, means for supplying heating medium to said annular chambers, evacuating means connected to the space between said packed casing and shaft, said space communicating with the end convolutions of the sections of the hollow flights.

3. In a vacuum pan, the improvement which consists in means for heating and simultaneously circulating the material undergoing treatment in said pan, comprising a hollow shaft and a plurality of hollow flight sections arranged along said shaft to provide a sectionalized screw conveyor, means for separately heating said hollow flights, and means for rotating said screw conveyor.

4. In a vacuum pan, the improvement which consists in means for heating and simultaneously circulating the material undergoing treatment in said pan, comprising a hollow shaft and a plurality of hollow flight sections separate from one another and arranged along said shaft to provide a sectionalized screw conveyor, each of said hollow flight sections having a fluid inlet adjacent one end thereof and a fluid outlet adjacent at the opposite end, the fluid outlet of each of said flight sections communicating with the interior of said hollow shaft, means for supplying a heating fluid to each of said fluid inlets, and means for rotating screw conveyor.

5. In a vacuum pan, a vertical agitating heater element comprising a rotatable hollow shaft, helical means substantially V-shaped in cross-section mounted upon said shaft and forming therewith a screw element divided transversely into a number of hollow flight sections providing separate helical conduits about the periphery of the shaft for respectively different portions of length of the latter, means including said shaft forming separate inlet connections to each of said helical conduits and an outlet connection common to said conduits for a heat transferring fluid, and means separately controlling the flow of the heat transferring fluid to each of said conduits, whereby the effective heat transferring surface of the heater element may be varied to accommodate different levels of material to be treated.

6. In a vacuum pan, a vertical agitating heater element comprising a rotatable hollow shaft, helical means substantially V-shaped in cross-section mounted on said shaft and forming therewith a screw element divided into a number of hollow flight sections including one providing a helical conduit about the periphery of the shaft for a portion of length of the latter and another hollow flight section providing a separate helical conduit about the periphery of the shaft for another portion of length of the latter, means including said shaft forming separate inlet connections to each of said first-named and second-named conduits and an outlet connection common to both of said conduits for a heat transferring fluid, and means separately controlling the flow of the heat transferring fluid to each of said conduits, whereby the heat transferring surface of the heater element may be varied to accommodate different levels of material to be treated.

7. In a vacuum pan, a vertical agitating heater element comprising a rotatable hollow shaft in communication at its upper end with a source of heat transferring fluid, helical means substantially V-shaped in cross-section mounted on said shaft and forming therewith a screw element divided into a number of hollow flight sections including one providing a helical conduit about the periphery of the shaft for a portion of length of the latter and another providing a separate helical conduit about the periphery of the shaft for another portion of length of the latter and below said first-named helical conduit, each of said conduits having an inlet and an outlet for a heat transferring fluid, the inlet and outlet of said first-named conduit and the outlet of said second-named conduit opening in fluid communication with the interior of said hollow shaft, a pipe co-axial with and spaced radially inwardly from the inner periphery of said hollow shaft in fluid communication at one end with a source of heat transferring fluid and opening in communication at its opposite end with the inlet of said sectionalized helical conduit, a sealing plug in said hollow shaft interposed between the inlet and outlet of said first-named conduit to prevent the passage of heat transferring fluid from the second-named conduit to the first-named conduit, and means separately controlling the flow of heat transferring fluid to the upper portion of said hollow shaft and to said co-axial pipe.

JACOB J. NEUMAN.